(12) United States Patent
Li et al.

(10) Patent No.: US 8,705,140 B2
(45) Date of Patent: Apr. 22, 2014

(54) SYSTEMS AND METHODS FOR DYNAMIC SHARPNESS CONTROL IN SYSTEM USING BINARY TO CONTINUOUS TONE CONVERSION

(75) Inventors: Xing Li, Webster, NY (US); Zhenhuan Wen, Pittsford, NY (US); Peter D. McCandlish, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 70 days.

(21) Appl. No.: 13/585,553

(22) Filed: Aug. 14, 2012

(65) Prior Publication Data

US 2014/0049799 A1    Feb. 20, 2014

(51) Int. Cl.
*G06T 5/00* (2006.01)
*H04N 1/407* (2006.01)
*H04N 1/409* (2006.01)

(52) U.S. Cl.
USPC ......................................... 358/3.27; 358/3.15

(58) Field of Classification Search
None
See application file for complete search history.

(56) References Cited

U.S. PATENT DOCUMENTS

| 6,020,979 | A | 2/2000 | Zeck et al. | |
| 7,352,490 | B1 * | 4/2008 | Tse et al. | 358/1.9 |

* cited by examiner

*Primary Examiner* — Mark Zimmerman
*Assistant Examiner* — Michael Burleson
(74) *Attorney, Agent, or Firm* — MH2 Technology Law Group LLP

(57) ABSTRACT

Embodiments relate to systems and methods for dynamic sharpness control in system using binary to continuous tone conversion. Image data can be processed in the image path of a copier, printer, or other device to enhance sharpness based on user settings. The image can originate in a high-resolution and/or high-color format. The user can select sharpness values to provide better rendered detail. A front-end high-pass 2D filter can be adjusted in response to the settings. A binarized version of the image data is produced in the downstream path. At the back of the image path, the image would conventionally be sent through a binary data to extended contone (BDEC) low-pass filter, set to a fixed level, to produce contone output, counteracting the user's sharpness settings. Instead of applying a fixed back-end filter, that stage can be dynamically adjusted to correspond to the user's sharpness settings, reducing the low-pass effect proportionately.

14 Claims, 5 Drawing Sheets

SYSTEMS AND METHODS FOR DYNAMIC SHARPNESS CONTROL IN SYSTEM USING BINARY TO CONTINUOUS TONE CONVERSION

FIELD

The present teachings relate to systems and methods for dynamic sharpness control in system using binary to continuous tone conversion, and more particularly, to platforms and techniques for accepting user-selected settings for the desired sharpness of printed output or other output for images which are generated using binary data extended to continuous tone processing.

BACKGROUND

In printing, copying, scanning, and other applications, the use of continuous tone (contone) image encoding has been known and used to generate high-resolution or high-color renderings of image files. Contone images can be based on image files whose data specifies color or shade values for each pixel using an arbitrary, or large, range of color values. A continuous or near-continuous range of colors can therefore be presented on color printers, computer monitors, and other output devices.

Besides the corresponding large demands for storage of contone images, additional considerations may affect the suitability or performance of systems designed to print or otherwise output contone-based files. For instance, for an image which is initially captured in RGB (red blue green) color values, then converted to LAB (lightness with a and b color opponent dimensions), a front-end two-dimensional (2D) filter can be applied to sharpen the image initially, before further image manipulation and conversion to binary (i.e., 0 or 1 white of black) values. Images which are processed in that type of image path, but then sent to an output device such as a printer which operates on binary data extended to continuous tone (BDEC) file types, will require a back-end (second) filter in order to arrive at the BDEC output.

In actuality, however, in order to generate a BDEC encoding of an image for printing or other output, the back-end filter must generally apply a low-pass filtering process. The low-pass filter is needed to derive the ultimate contone representation which can be sent to a rendering engine or other final stages in printers or other devices which expect contone-based image files. In known printers or other devices of this type, the back-end filter is fixed to a set value to generate the BDEC-based output. In practice, the effect of the low-pass back-end filter is to blur or smear some details of the image, since some high-frequency edges or other features will not be passed. The user's desired sharpness settings, which may be configured to cause an adjustment in the front-end filter, can therefore be defeated, or partially defeated, by the action of the necessary back-end BDEC filter. The user may therefore not receive exactly the type of sharpness in the printed output, or other output, that they desired.

In addition, in known systems using this general type of BDEC-based image path, the imaging logic can segment or separate different sections of an image into image areas and text areas, in an effort to preserve the legibility of textual portions. However, the imaging logic can at times make mistakes in the classification of textual sections, for instance labeling or identifying some of those sections as an image area, when it is in fact a section of text. When a text segment is classified as an image area, and then sent downstream to the back-end BDEC filter, the low-pass effect of that filter can blur or smudge the pixel-based rendering of that text, to a point where that text is no longer legible. This is particularly true for text segments that are presented in a small font, or which involve special characters or symbols.

it may be desirable to provide methods and systems for dynamic sharpness control in system using binary to continuous tone conversion, in which the user of a printer or other BDEC-based output systems can make a sharpness selection for their desired output, and have that sharpness setting automatically change the filtering characteristics of the back-end filter to better preserve sharpness and detail.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for dynamic sharpness control in system using binary to continuous tone conversion. More particularly, embodiments relate to platforms and techniques for receiving and processing images that are converted to BDEC-based formatting, but in which the user's desired sharpness settings can automatically be used to change the internal back-end filter to compensate for the effects of BDEC conversion before outputting to the rendering engine or other final output stages.

Reference will now be made in detail to exemplary embodiments of the present teachings, which are illustrated in the accompanying drawings. Where possible the same reference numbers will be used throughout the drawings to refer to the same or like parts.

Figure 1:
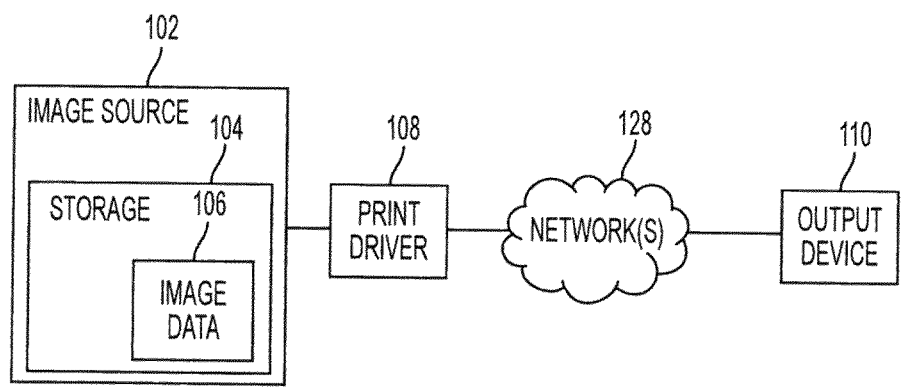
FIG. 1 illustrates an overall network arrangement which can be used in systems and methods for dynamic sharpness control in system using binary to continuous tone conversion, according, to various embodiments.

FIG. 1 illustrates an overall network 100 in which systems and Methods for dynamic sharpness control in system using binary to continuous tone conversion can operate, according to aspects. In aspects as shown, an image source 102 can produce, transmit, encode, and/or store an image data 106. In aspects, the image source 102 can be or include, for instance, an imaging device such as a copy device or machine, a multi-function device or machine, a digital camera, video camera, a scanner, a computer such as a desktop, laptop, and/or server computer, and/or other device, platform, service, and/or hardware. In aspects, the image source 102 can generate, host, store, and/or maintain the image data 106 in storage 104, such as hard disk storage, optical storage, electronic memory, and/or other types of storage hardware or media, although it will be appreciated that in implementations such as a copy device or machine, the image data 106 may not be permanently stored or stored in file format in the image source 102. According to aspects, the image data 106 can be an image file encoded, for example, in a comparatively high-resolution and/or high-color palette (e.g., 24- or 32-bit) format. The image data 106 can be encoded, merely for example, in LAB (lightness, a and b) format or color space specified in the International Commission on Illumination (CIE) 1976 color space standard. In aspects, the image data 106 can be encoded in other formats or according to other standards, such as the TIFF (Tagged Image File Format), the RAW file format, and/or others. According to aspects, as noted the image source 102 can be or include a device which captures and initially encodes or stores the image data 106, but can also be or include a device or service which receives and stores the image data 106 from one or more other sources, such as, for instance, an online digital photo storage site or service.

In aspects, the image source 102 can communicate with a print driver 108 via one or more networks 128. In aspects, the one or more networks 128 can be or include a local area network (LAN) such as an Ethernet™ network, a WiFi™ wireless network, and/or can be or include the Internet and/or a cloud-based network. Other public and/or private networks, channels or connections can be utilized to connect the image source 102 with the print driver 108 and/or other nodes or destinations. In aspects, the print driver 108 can be or include a print server, print service, application, and/or other hardware, software, application, and/or service. In aspects as shown, the print driver 108 can in turn be connected to an output device 110, such as a printer, multi-function device or machine, facsimile device or machine, display, and/or other device. In aspects, the print driver 108 can be connected directly to the output device 110 without an intervening set of one or more networks 128, such as by wired or wireless connections, and/or can be connected indirectly through intermediate servers, services, the Internet, and/or other connections or channels. In implementations, the print driver 108 and other associated logic and resources can be hosted entirely in the image source 102, such as in the hardware, software, firmware, applications, and/or services of a copy device or machine and/or multifunction printer or other device or machine.

Figure 2:
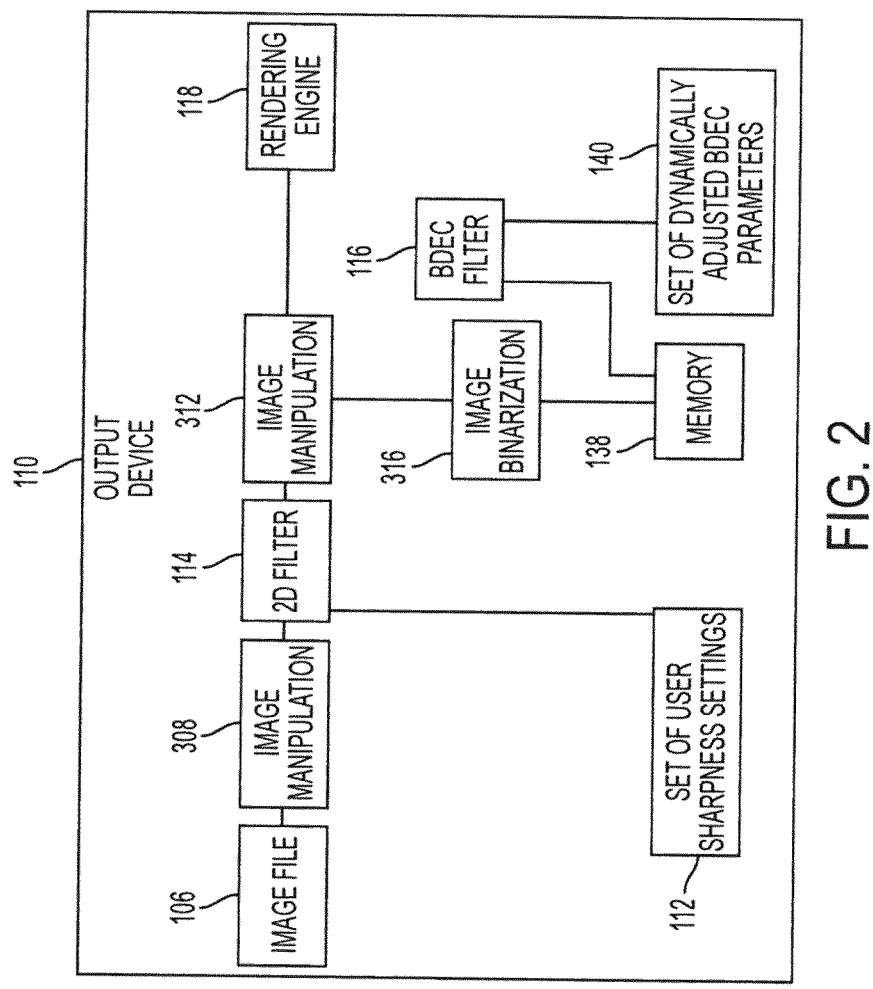
FIG. 2 illustrates various hardware, software, and/or other resources that can be incorporated in an output device which can generate enhanced printed or other output, according to various embodiments.

According to implementations, the output device 110 can be configured to incorporate systems and methods for dynamic sharpness control in system using binary to continuous tone conversion, in various regards. More specifically and as for instance illustrated in FIG. 2, the output device 110 can comprise a set of hardware, software, application, service, and/or other resources, by which the image data 106 can be passed through an image path and ultimately printed and/or otherwise outputted via a rendering engine 118 and/or other stages. In aspects as shown, the image data 10 can be received in the output device 110, such as by user command or automatically, and processed according to the user's selections for image settings and/or features. In aspects as shown, the user can, for instance, supply a set of user sharpness settings 112, which can indicate the degree or extent to which the user wishes to clarify, articulate, and/or sharpen the visual impression of the image data 106. According to aspects, the user can supply, for instance, a sharpness setting that can be selected in a range such as 1 to 5, with 1 representing an unaltered image while 5 represents an image sharpened to the greatest degree. Other scales, values, and/or parameters can be used. In aspects, the set of user sharpness settings 112 can for instance be supplied by user input provided on a keypad, touchpad, and/or other input device incorporate in the output device 110, and/or can be supplied via a software or service associated with the output device. Other input techniques can be used. After the output device 110 has received the user's set of user sharpness settings 112, those settings can be used to adjust the filtering action of a front-end, or 2D filter 114 on the image data 106, such as by increasing the high-pass filtering action of the 2D filter 114. While as noted in implementations the 2D filter 114 can act or operate as a high-pass filter, in implementations, the 2D filter can also or instead act or operate as a low-pass filter, and/or perform other filtering functions or operations.

After processing the image data 106 using the 2D filter 114, a binarized version of the image data 106 can be produced, and can for example be stored in memory 138 of the output device 110. The binarized version of the image data 106 can be or include, for example, a representation of the image data 106 in which individual pixels of the image data 106 are encoded as 0 or 1, representing black or white, binary CMYK, and/or other values. In aspects, a binarized version of an image file can be used, for instance, to produce a half-tone printed output of the image, depending on the output hardware. According to aspects, in implementations of the present teachings, the output device 110 can comprise a rendering engine 118 which operates on contone-based images, rather than half-tone and/or binarized images.

In aspects as shown, therefore, the binarized version of the image data 106 can be sent to a BDEC filter 116, which can convert the binarized version to a BDEC version of the same image content using low-pass filtering. According to aspects, the low-pass filtering of the BDEC filter 116 can serve to remove some portion of the high-frequency content of the binarized version of the image data 106, which can have the effect of blurring, smearing, and/or otherwise rendering misclassified text regions more indistinct, and/or tend to reduce the visible contract between different user-selected sharpness levels. In aspects, this effect can tend to counteract the set of user sharpness settings 112 in an unadjusted BDEC-type filter. According to aspects of the present teachings, however, the BDEC filter 116 can be configured to be adjustable, and to automatically adapt to the values received in the set of user sharpness settings 112 using a set of dynamically adjusted BDEC filter parameters 140. Thus if the user selects a sharpness setting of "1," which in implementations can represent the least-sharpened and/or unaltered image state, the BDEC filter 116 can be left at its default or original value.

Conversely, if the user selects a sharpness settings of "5" (on an illustrative scale of 1 to 5), then the low-pass filtering effect of the BDEC filter 116 can be reduced, for instance to a lower value or a minimum possible value via the set of dynamically adjusted BDEC filter parameters 140, so that less high-frequency content is removed, intermediate values can cause an intermediate reduction in low-pass filtering strength and/or high-frequency attenuation. In aspects, the amount by which the strength of the low-pass filtering action of the BDEC filter 116 is adjusted can vary in a linear manner with the set of user sharpness settings 112, and/or can vary according to a non-linear function of the selections contained in the set of user sharpness settings 112.

Figure 3:
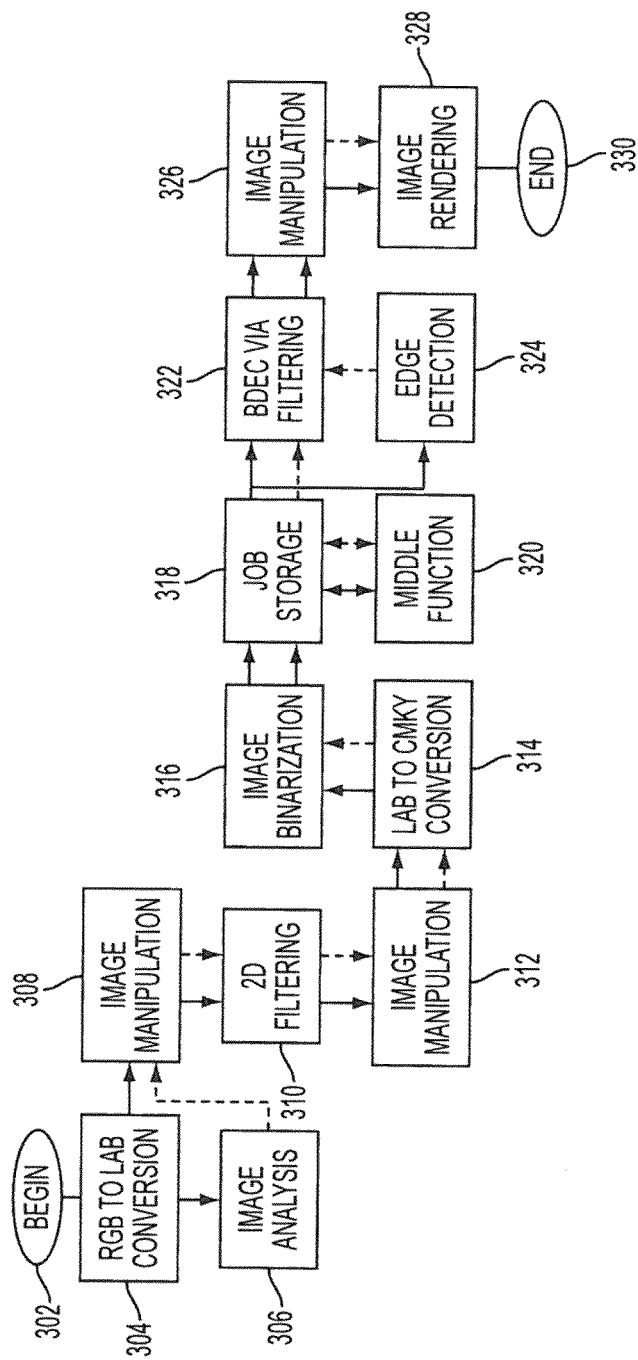
FIG. 3 illustrates a flowchart of image processing, filtering, and related processing, according to various embodiments.

FIG. 3 illustrates a flowchart of image filtering and other processing that can be performed in systems and methods for dynamic sharpness control in system using binary to continuous tone conversion, according to aspects. In 302, processing can begin. In 304, the output device 110 and/or other image output platform, application, logic, and/or service can carry out an RGB (red green blue) to LAB conversion on the image data 106. In 306, the output device 110 and/or other image output platform, application, logic, and/or service can perform an image analysis on the image data 106, for example, to generate a histogram of the colors that are present in the image data 106, and/or to perform other analyses or calculations. In 308, the output device 110 and/or other image output platform, application, logic, and/or service can perform image manipulation on the image file 110, such as, for example, to crop the image, shrink the image to fit a desired target size, and/or to perform other manipulations or processing.

In 310, the output device 110 and/or other image output platform, application, logic, and/or service can perform 2d filtering on the image data 106, such as, for example, by applying the 2D filter 114 to the image data 106 based on the set of user sharpness settings 112. In 312, the output device 110 and/or other image output platform, application, logic, and/or service can perform image manipulation, which again can include processing such as cropping the image, shrinking the image to fit a desired target size, compressing the image data 106 and/or related representations of the image, and/or to perform other manipulations or processing. In 314, the output device 110 and/or other image output platform, application, logic, and/or service can perform a conversation of the image data 106 and/or related representations from LAB format to CMYK (cyan magenta yellow black) format. In 316, the output device 110 and/or other image output platform, application, logic, and/or service can perform image binarization on the image data 106 and/or related representations, in which each pixel of the image data 106 can be converted to a 0 or 1, black or white, and/or offer value.

In 318, the output device 110 and/or other image output platform, application, logic, and/or service can perform job storage, including operations such as storing a binarized version of the image file in memory 138 and/or other storage or media. In 320 the output device 110 and/or other image output platform, application, logic, and/or service can apply a middle function or functions to the binarized version of the image data 106 and/or related representation. In aspects, the middle function can include further image processing tools or adjustments to the binarized version of the image data 106.

In 322, the output device 110 and/or other image output platform, application, logic, and/or service can generate a BDEC version of the image data 106 via filtering operations, such as applying the back-end or BDEC filter 116 to the binarized version of the image data 106 and/or related representation. In aspects, the filtering action of the BDEC filter 116 can be automatically adjusted, scaled, weighted, and/or otherwise adapted to provide a less aggressive or more aggressive low-pass filtering action to the binarized version of the image data 106, such as by decreasing or increasing the cutoff frequency, intensity, and/or other parameters of the BDEC filter 116.

In 324, before, and/or in parallel with 322, the output device 110 and/or other image output platform, application, logic, and/or service can perform edge detection on the binarized version of the image data 106, for instance, to label, segment, ad/or otherwise identify portions of the image data 106 which contain or comprise text characters. In implementations, those portions or areas of the image data 106 and/or related representations may not be subject to further image processing, but instead be captured or encoded as ASCII and/or other character-related values. In 326, the output device 110 and/or other image output platform, application logic, and/or service can perform image manipulation on the BDEC version of the image data 106, such as the types of image processing or manipulation noted above, and/or others. In 328, the output device 110 and/or other image output platform, application, logic and/or service can perform image rendering, such as processing the image data 106 via a print engine and printing the image data 106. In 330, processing can, in various cases, repeat, return to a prior processing point, jump to a further processing point, or end.

Figure 4A:
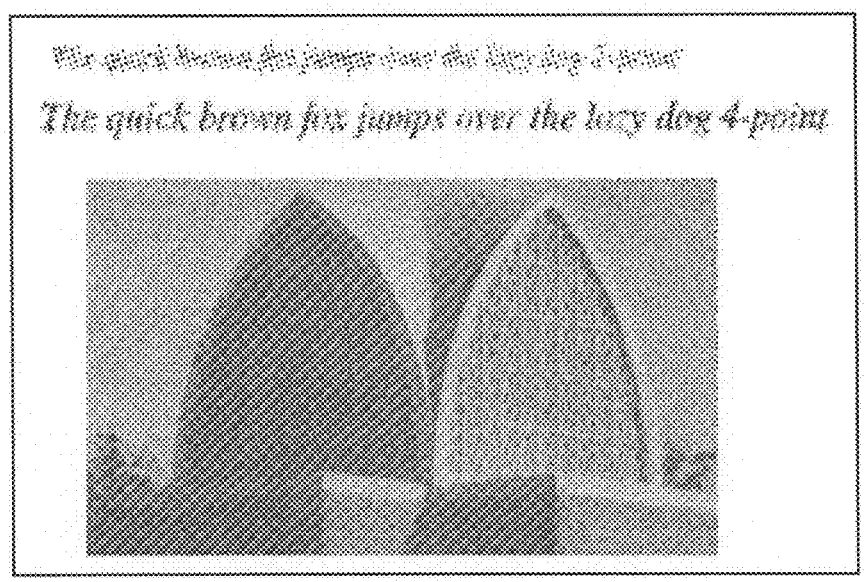
FIGS. 4A and 4B illustrate exemplary output that can be generated according to known BDEC devices and output devices according to systems and methods for dynamic sharpness control in system using binary to continuous tone conversion, respectively, according to various aspects.
Figure 4B:
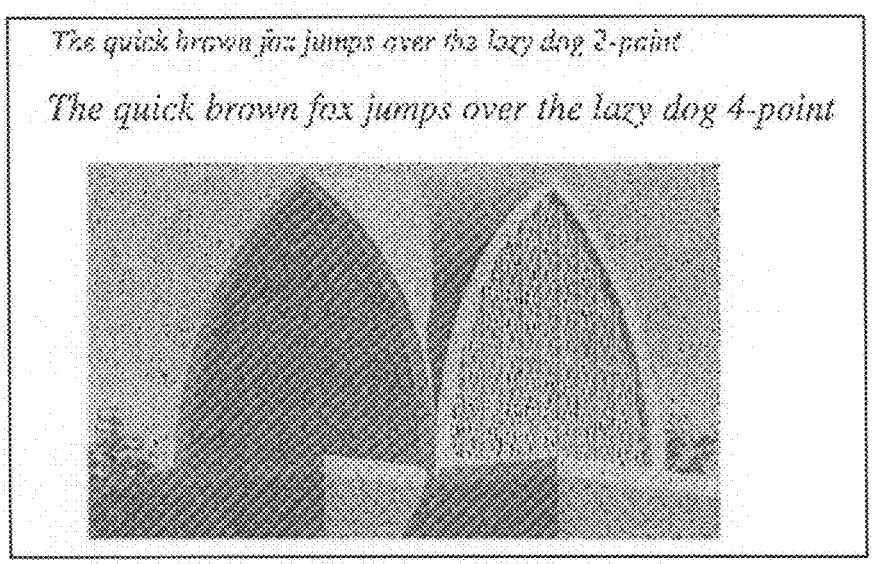

FIG. 4A illustrates an exemplary printed output of an image data 106, whose BDEC filter 116 is of dynamically adjusted based on the set of user sharpness settings 112. In aspects as shown, the overall image sharpness of the image object (building) may be rendered more indistinct, while sections of small text, such as 4-point font text, that has been misidentified as an image area rather than a text area, can be rendered illegible. Printed output rendered according to the present teachings, however, as shown in FIG. 4B, can produce increased overall image sharpness or distinctness, while also preserving enough sharpness in small text accidentally identified as an image area to make that text legible. Other varieties of output and image characteristics can be produced or enhance, using systems and methods for dynamic sharpness control in system using binary to continuous tone conversion.

Figure 5:
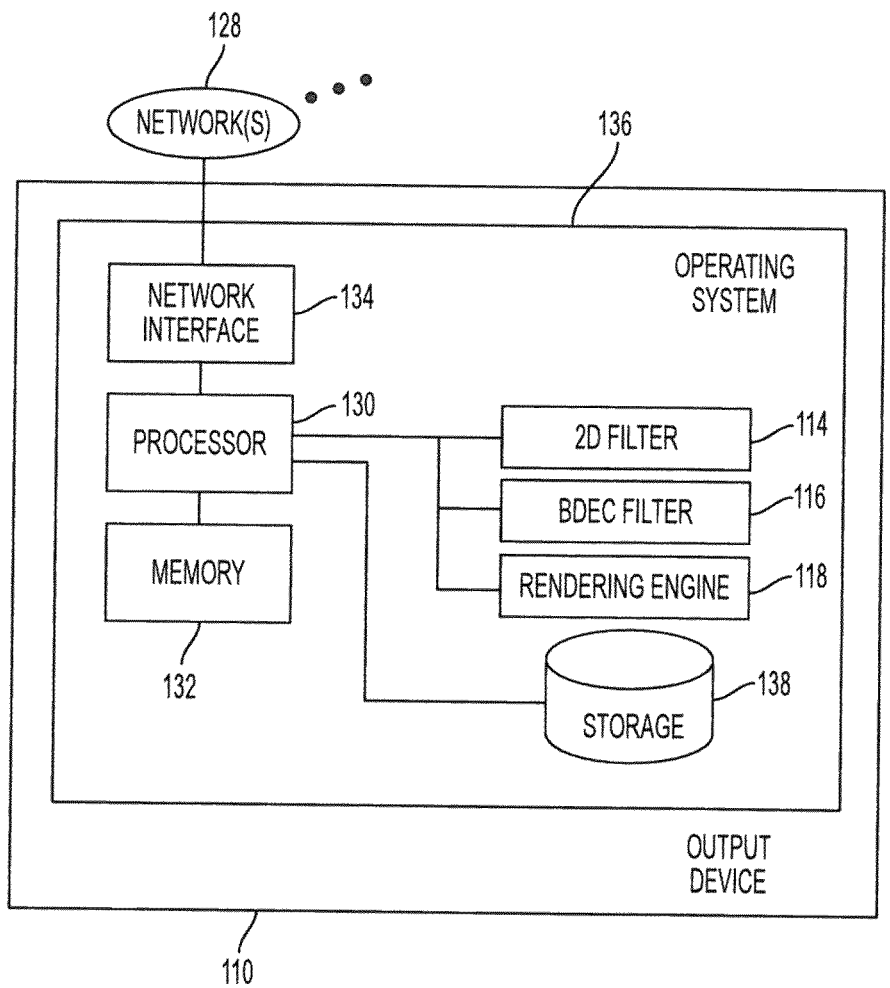
FIG. 5 illustrates exemplary hardware, software, and other resources that can be used in an output device in systems and methods for dynamic sharpness control in system using binary to continuous tone conversion, according to various further regards.

FIG. 5 illustrates various hardware, software, and other resources that can be used in implementations of dynamic sharpness control in system using binary to continuous tone conversion, according to embodiments. In embodiments as, shown, the output device 110 can comprise a platform having hardware, software, and/or other resources including processor 130 communicating with memory 132, such as electronic random access memory, operating under control of or in conjunction with an operating system 136. The processor 130 in embodiments can be incorporated in one or more servers, clusters, and/or other computers or hardware resources, and/or can be implemented using cloud-based resources. The operating system 136 can be, for example, a distribution of the Linux™ operating system, the Unix™ operating system, or other open-source or proprietary operating system or platform. The processor 130 can communicate with a network interface 134, such as an Ethernet or wireless data connection, which in turn communicates with the one or more networks 128, such as the Internet or other public, private, local, and/dr remote networks, via which an image data 106 can be received from the image source 102 and communicated to the print driver 108 and/or output device 110. The processor 130 can, in general, be programmed or configured to execute control logic and to control image processing operations, including to apply the 2D filter, BDEC filter, and to generate the one or more binarized, BDEC, and/or other versions of the image data 106. In aspects, the print driver 108 and/or image source 102 can be or include resources similar to those of the output device 110, and/or can include additional or different hardware, software, and/or other resources. Other configurations of the output device 110, associated network connections, and other hardware, software, and service resources are possible.

The foregoing description is illustrative, and variations in configuration and implementation may occur to persons skilled in the art. For example, while embodiments have been described in which the output device 110 can be or include a printing device, in aspects, the output device 110 can be or include other types or classes of devices, such as facsimile device or machines, multi-function or copier device or machines, electronic displays, and/or others. Other resources described as singular or integrated can in embodiments be plural or distributed, and resources described as multiple or What claimed is:

1. A method of processing images, comprising:
receiving image data;
receiving a set of user sharpness selections for processing the image data;
filtering the image file using a front-end filter before rendering the image data to binary data;
automatically generating a set of dynamically adjusted binary data to extended continuous tone (BDEC) filter parameters based on the set of user sharpness selections;
filtering the BDEC version of the image file using a back-end filter using the set of dynamically adjusted BDEC filter parameters to generate a BDEC version of the image data; and
rendering the BDEC version of the image data via an output device.

2. The method of claim wherein the front-end filter comprises at least one of a high-pass filter or a low-pass filter.

3. The method of claim 2, wherein the front-end filter comprises a high-pass filter configured as a two-dimensional filter.

4. The method of claim 1, wherein the back-end filter comprises a low-pass filter.

5. The method of claim 1, wherein the set of user sharpness selections comprises a sharpening value selected from a sharpening scale.

6. The method of claim 1, further comprising performing edge detection on the image data.

7. The method of claim 1, wherein the output device comprises at least one of a copy device printer device, a multi-function device, a facsimile device, or a display device.

8. An image output system, comprising:
a network interface to an image source storing image data; and
a processor, communicating with the image source via the network interface, the processor being configured to—
receive the image data,
receive a set of user sharpness selections for processing the image data,
filter the image file using a front-end filter before rendering the image data to binary data,
automatically generate a set of dynamically adjusted binary data to extended continuous tone (BDEC) filter parameters based on the set, of user sharpness selections,
filter the BDEC version of the image file using a back-end filter using the set of dynamically adjusted BDEC filter parameters to generate a BDEC version of the image data, and
render the BDEC version of the image data.

9. The system of claim 8, wherein the front-end filter comprises at least one of a high-pass filter or a low-pass filter.

10. The system of claim 9, wherein the front-end filter comprises a high-pass filter configured as a two-dimensional filter.

11. The system of claim 8, wherein the back-end filter comprises a low-pass filter.

12. The system of claim 8, wherein the set of user sharpness selections comprises a sharpening value selected from a sharpening scale.

13. The system of claim 8, wherein the processor is further configured to perform edge detection on the image data.

14. The system of claim 8, wherein the image output system comprises at least one of a copy device, a printer device, a multi-function device, a facsimile device, or a display device.

* * * * *